United States Patent [19]

Standke et al.

[11] Patent Number: 5,591,818
[45] Date of Patent: Jan. 7, 1997

[54] ORGANOSILANE POLYCONDENSATION PRODUCTS

[75] Inventors: Burkhard Standke, Lörrach; Hartwig Rauleder, Rheinfelden; Claus-Dietrich Seiler, Rheinfelden; Hans-Joachim Kötzsch, Rheinfelden; Hermann Peeters, Siegburg, all of Germany

[73] Assignee: Hüls Aktiengesellschaft, Marl, Germany

[21] Appl. No.: 413,042

[22] Filed: Mar. 29, 1995

[51] Int. Cl.$^6$ ................................................ C08G 77/26
[52] U.S. Cl. .............................. 528/38; 528/26; 556/424; 556/425
[58] Field of Search ...................... 528/38, 26; 556/424, 556/425

[56] References Cited

U.S. PATENT DOCUMENTS

| | | |
|---|---|---|
| 3,355,424 | 11/1967 | Brown ........................... 528/33 |
| 4,330,444 | 5/1982 | Pollman . |
| 4,382,991 | 5/1983 | Pollman . |
| 4,472,566 | 9/1984 | Ziemelis et al. ................. 556/424 |
| 4,499,152 | 2/1985 | Green et al. . |
| 4,749,614 | 6/1988 | Andrews et al. . |
| 4,849,294 | 7/1989 | Plueddemann . |
| 4,902,556 | 2/1990 | Benedikt et al. . |
| 5,115,049 | 5/1992 | Imperante et al. . |

FOREIGN PATENT DOCUMENTS

| | | |
|---|---|---|
| 845040 | 2/1977 | Belgium . |
| 0176062 | 4/1986 | European Pat. Off. . |
| 0338128 | 10/1989 | European Pat. Off. . |
| 0353766 | 2/1990 | European Pat. Off. . |
| 0487211 | 5/1992 | European Pat. Off. . |
| 1811814 | 12/1969 | Germany . |
| 2648240 | 6/1977 | Germany . |
| 2802242 | 7/1978 | Germany . |
| 1259369 | 10/1989 | Japan . |
| 8800527 | 1/1988 | WIPO . |

*Primary Examiner*—Melvyn I. Marquis
*Attorney, Agent, or Firm*—Felfe & Lynch

[57] ABSTRACT

Disclosed are organosilane polycondensation products prepared by hydrolysis of an hydrogen salt of an aminosilane compound or by hydrolysis of an aminosilane followed by reaction with an alkyl salt. The compounds are useful in forming stable aqueous solutions and as adhesion promoters between inorganic and organic surfaces.

31 Claims, No Drawings

ORGANOSILANE POLYCONDENSATION PRODUCTS

FIELD OF THE INVENTION

This invention relates to novel organosilane polycondensation products, to methods for their preparation, and to their use as adhesion promoters.

More particularly, the present invention relates to organosilane polycondensation products of the formula $$[Z-SiO_{[1.5-(a+b+z)/2]}(OH)_a(OR)_bR'_z]_r \qquad (I)$$

wherein

R and R' are each independently alkyl of 1 to 8 carbon atoms;

Z is $$-(CH_2)_nNH_cR_d^1(CH_2)_mNH_eR_f^2 \cdot HX_{(f+d)} \qquad (II);$$

X is an inorganic or organic acid radical, preferably Cl⁻ or $CH_3COO^-$;

$R^1$ is $-(CH_2)_pAr^1$;

$R^2$ is $-(CH_2)_qAr^2$;

$Ar^1$ and $Ar^2$ are each independently aryl, aralkyl or aralkenyl;

$0<a<3$, $0<b<3$, $(a+b+z)<3$, $z \leq 1$ and $r>1$;

n, m, p and q are each independently integers of 1 to 8, inclusive; and $c \leq 1$, $d \leq 1$, $e \leq 2$, $f \leq 2$, $c+d=1$ and $e+f=2$.

BACKGROUND OF THE INVENTION

The use of hydrochlorides of functionalized aminosilanes, such as 3-(N-vinylbenzyl-2-aminoethyl)aminopropyltrimethoxysilane or 3-(N-benzyl-2-aminoethyl)aminopropyltrimethoxysilane, as adhesion promoters is well known. U.S. Pat. No. 4,902,556, European Patent 353,766 and U.S. Pat. No. 4,849,294 disclose the use of adhesion promoters for coating of metals, preferably copper and iron, with polyolefins or epoxide resins. Adhesion promotion on glass surfaces is disclosed in European Patent 338,128, International Application WO 8,800,527, U.S. Pat. No. 4,499,152, U.S. Pat. No. 4,382,991, U.S. Pat. No. 4,330,444 and German Patent 2,802,242 (adhesion promoters for diverse resin systems on glass fibers), and Belgian Patent 845,040 (adhesion promoters for epoxide resins on plate glass for improved alkali resistance). Their use as adhesion promoters for oxidic fillers in diverse organic polymers is also disclosed (Japanese Patent 01/259,369 and European Patent 176,062). For ecological reasons, such as reduction of the chemical oxygen demand in effluents and operating safety reasons, the use of adhesion promoters in aqueous systems is of advantage. However, the above referred to substances are only sparsely soluble in water. Aqueous formulations thereof are not possible without the use of stabilizing additives or significant amounts of organic acids, and even then their use only in low concentrations of less than 1% is possible (see Japanese Patent 62/243,624, U.S. Pat. No. 4,499,152, U.S. Pat. No. 4,382,991, U.S. Pat. No. 4,330,444 and German Patent 2,802,242).

OBJECTS OF THE INVENTION

It is an object of the present invention to provide water soluble functionalized organosilanes of the type referred to above which are suitable for use as adhesion promoters in aqueous systems.

Other objects and advantages of the invention will become apparent as the description thereof proceeds.

DESCRIPTION OF THE INVENTION

The above object is achieved in accordance with the present invention by a targeted partial hydrolytic polymerization of a functionalized aminosilane hydrosalt of the formula $$Z-Si(OR)_{3-z}R'_z \qquad (III),$$

or by targeted partial hydrolytic polymerization of an aminosilane of the formula $$H_2N(CH_2)_mNH(CH_2)_nSi(OR)_{3-z}R'_z \qquad (IV),$$

and subsequent functionalization by reaction with a corresponding functional alkyl salt, $$X-R^1 \qquad (V)$$

and/or $$X-R^2 \qquad (V')$$

resulting in the formation of a water-soluble organosilane polycondensation product of the Formula (I), where X is preferably Cl⁻ and the variables Z, R, R', $R^1$, $R^2$, m, n and z have the meanings previously defined. The organosilane polycondensation products of the present invention are also designated as polysiloxanes or as oligomeric or polymeric siloxanes.

The partial hydrolysis is to be understood chemically to mean that the alkoxy units of the silanes are not completely hydrolyzed, so that the originally hydrolyzable silicon valences present in the condensation product become saturated not just as in Si—OH or Si—O—Si components, but also by individual alkoxy groups (Si—OR). In the practice of the hydrolysis, therefore, the reaction conditions are set and controlled in a targeted manner for example: by concentration ratios, temperature, reaction time, etc.

Compared with the pure functionalized aminosilanes of Formula III, the products of the Formula I in accordance with the present invention have the advantage that they are soluble in water, so that the products can be used in aqueous coating systems without stabilizing additives and also in high concentrations.

The preparation procedure is illustrated with the aid of a compound of this invention of the formula $[HCl \cdot CH_2=CH-C_6H_4-CH_2-NH-(CH_2)_2NH(CH_2)_3-SiO_{[1.5-(a+b+z)/2]}(OH)_a(OCH_3)_bR'_z]_r$ (wherein $0<a<3$, $0<b<3$, $(a+b+z)<3$, $z \leq 1$, $r>1$) as an example:

1. Preparation of a Functional Aminosilane Hydrohalide by Hydrolytic Polymerization A solution of the aminosilane compound of the formula $CH_2=CH-C_6H_4-CH_2-NH-(CH_2)_2NH(CH_2)_3-Si(OCH_3)_3 \cdot HCl$ in methanol was reacted with an amount of water corresponding 0.25 to 4 times (preferably 1.5 times) the molar silicon content of the functional aminosilane hydrochloride starting material. The partial hydrolytic polymerization was complete after a few hours. The resulting mixture of siloxane oligomers and polymers in equilibrium with silanols was ready for use as an adhesion promoter between inorganic and organic surfaces, in particular for the reinforcement of organic polymers with inorganic, preferably oxidic, fillers, glass fibers or metal particles, or for coating of inorganic surfaces, preferably of metals, metal oxides or glass with organic polymers.

2. Preparation of an Aminosilane by Hydrolytic Polymerization with Subsequent Functionalization by Reaction with a Functional Alkyl Halide $H_2N(CH_2)_2NH(CH_2)_3—Si(OCH_3)_3)_3$ was polymerized hydrolyrically with an amount of water corresponding to 0.25 to 4 times (preferably 1.5 times) the molar silicon content of the aminosilane starting material. A viscous liquid formed, which was diluted with methanol for easier handling. The resulting solution, which had a low viscosity, was then reacted with an amount of vinylbenzyl chloride ($CH_2$=CH—$C_6H_4$—$CH_2$—Cl), optionally diluted with methanol, which corresponded to the molar amount of the aminosilane starting material. A mixture of siloxane oligomers and polymers in equilibrium with silanols resulted.

The molar amount of water which was used corresponded to 0.25 times to 4 times the molar silicon content of the aminosilane starting material. Complete miscibility with water was not achieved with smaller amounts of water. If larger amounts of water are used, precipitates form during the synthesis of the hydrolysis product. The polyorganosiloxanes prepared in accordance with the present invention are generally highly viscous or solid in pure form. For ease of handling, the preparation is carried out in a solvent, preferably in an alcohol and particularly preferentially in that alcohol which is liberated during the hydrolysis. Preferably, monohydric or polyhydric, branched chain, straight chain or cyclic alcohols of 1 to 18 carbon atoms are used as solvents. Preferred solvents are methanol and ethanol.

The preparation of the products of the present invention can be carried out in a simple stirring vessel provided with a metering device and is carried out in a nitrogen atmosphere or with nitrogen shielding. Advantageously, the water required for the hydrolysis is metered into the silane solution or into the pure silane. The rate at which the water is added is not critical, provided that the indicated concentration ranges are maintained and the heat evolved during the hydrolysis is removed from the reaction mixture. Reaction temperatures of from room temperature to about 65° C. are preferred but the reaction can be conducted at higher temperatures. Reaction temperatures above 100° C. must be avoided if the product contains alkenyl groups because of the risk of polymerization. If, in the course of the preparation of the products of the present invention, the aminosilane is first polymerized hydrolytically by adding water, the reaction to yield the functionalized aminopolysiloxane is advantageously carried out by metering the corresponding functional alkyl salt, preferably the functional alkyl chloride, into the previously prepared aminopolysiloxane. In order to avoid highly viscous products and to control local temperature peaks (exothermic reaction), the functional alkyl chloride can be diluted with a solvent. The solvent used for this purpose is advantageously the alcohol which is liberated during the hydrolytic polymerization. Both reaction steps can optionally be carried out in one and the same apparatus. The concentration of the functional aminopolysiloxanes and the viscosity of the solution can be adjusted by distillative removal of the solvent which may have been used in their preparation or by dilution with solvents.

The functional aminopolysiloxanes of the present invention and their solutions are miscible with water in all proportions without immediate turbidity or precipitation taking place. Long-term stability of dilute aqueous solutions can be achieved by adjusting the pH of the solution to less than 4.5 by adding a sufficient amount of acid, preferably acetic acid.

The products of the present invention, of Formula I above, are useful as adhesion promoters between inorganic and organic surfaces, particularly for the reinforcement of organic polymers with inorganic, preferably oxidic, fillers, glass fibers or metal particles, and also for coating of inorganic surfaces, preferably of metals, metal oxides or glass, with organic polymers.

The following examples illustrate the present invention and will enable others skilled in the art to understand it more completely. It should be understood, however, that the invention is not limited solely to the particular examples given below.

EXAMPLE 1

Preparation of a Functionalized Aminopolysiloxane by Hydrolytic Polymerization of

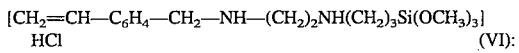
$[CH_2=CH—C_6H_4—CH_2—NH—(CH_2)_2NH(CH_2)_3Si(OCH_3)_3]$
HCl  (VI):

750 g of a 50% by weight solution of compound VI (silicon content 3.74% by weight) in methanol was introduced into a heatable 2-liter, three-necked flask provided with a nitrogen blanket, a distillation device and a dropping funnel. 27 g of water (corresponding to 1.5 mols of water per mol of silicon in the starting compound) were then slowly metered into the flask while stirring the contents. 27 g of methanol were then removed from the reaction mixture by distillation under ambient pressure. The solution was then heated at 60° C. for about 3 hours. It had a silicon content of 3.74% by weight and contained the oligomer mixture of the formula

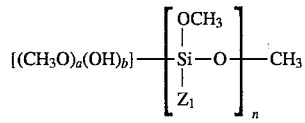

wherein
$Z_1$ is —$[(CH_2)_3NH(CH_2)_2NH—CH_2—C_6H_4—CH=CH_2]$.HCl,
n is an integer from 1 to 20 inclusive, and
a+b=1, a≦1, b=1.

EXAMPLE 2

Preparation of a Functionalized Aminopolysiloxane by Hydrolytic Polymerization of

$[C_6H_5—CH_2—NH—(CH_2)_2NH(CH_2)_3Si—(OCH_3)_3]HCl$  (VII):

697 g of a 50% by weight solution of compound VII in methanol (4.01% by weight silicon content) were introduced into a heatable 2-liter three-necked flask provided with a nitrogen blanket, a distillation device and a dropping funnel. 27 g of water (corresponding to 1.5 mols of water per mol of silicon in the starting material) were then slowly metered into the flask while stirring the contents. 27 g of methanol were then removed from the reaction mixture by distillation under ambient pressure. The resulting solution was then heated at about 60° C. for about 3 hours. It had a silicon content of 4.01% by weight and contained the oligomer mixture of the formula

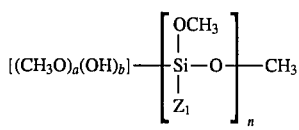

wherein $Z_2$ is —[(CH$_2$)$_3$NH(CH$_2$)$_2$NH—CH$_2$—C$_6$H$_5$].HCl, n is an integer from 1 to 20 inclusive, and a+b=1, a≦1, b≦1.

EXAMPLE 3

Preparation of a Functionalized Aminopolysiloxane from Hydrolyrically Polymerized NH$_2$(CH$_2$)$_2$NH(CH$_2$)$_3$Si(OCH$_3$)$_3$ and Reaction thereof with CH$_2$=CH—C$_6$H$_4$—CH$_2$—Cl 222 g of aminoethylaminopropyltrimethoxysilane were introduced into a heatable 1-liter, three-necked flask provided with a nitrogen blanket, a reflux condenser and a dropping funnel. 27 g of water (corresponding to 1.5 mols per mol of silicon in the starting compound) were then slowly metered into the flask while stirring its contents. During this addition the temperature of the reaction mixture rose to about 60° C. This temperature was maintained for 1 hour by heating. 105 g of methanol were then added. 152.5 g of vinylbenzyl chloride, admixed with 104.5 g of methanol, were then slowly metered into the flask while stirring its contents. The temperature of the reaction mixture was maintained at 64° C. for about 3 hours by cooling during metering and then heating. After cooling, the mixture was diluted with 138 g of methanol until it had a silicon content of 3.74% by weight by weight and contained the oligomer mixture of the formula

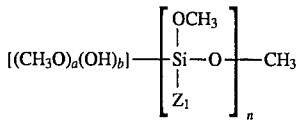

wherein $Z_1$ is —[(CH$_2$)$_3$NH(CH$_2$)$_2$NH—CH$_2$—C$_6$H$_4$—CH=CH$_2$].HCl, n is an integer from 1 to 20 inclusive, and a+b=1, a≦1, b≦1.

EXAMPLE 4

Preparation of a Functionalized Aminopolysiloxane from Hydrolytically Polymerized NH$_2$(CH$_2$)$_2$NH(CH$_2$)$_3$Si(OCH$_3$)$_3$ and Reaction of the same with C$_6$H$_5$—CH$_2$—Cl 222 g of aminoethylaminopropyltrimethoxysilane were introduced into a heatable 1-liter, three-necked flask provided with a nitrogen blanket, a reflux condenser and a dropping funnel. 27 g of water, corresponding to 1.5 mols of water per mol of silicon in the starting compound, were then slowly metered into the flask while stirring its contents. During this addition the temperature of the reaction mixture rose to about 60° C. This temperature was maintained for 1 hour by heating. 92 g of methanol were then added to the reaction mixture, and then a mixture of 126.5 g of benzyl chloride and 91.5 g of methanol was slowly metered into the flask while stirring its contents. The temperature of the reaction mixture was maintained at 64° C. for about 3 hours by cooling during metering and then heating. After cooling, the mixture was diluted with 138 g of methanol until it had a silicon content of 4.01% by weight and contained the oligomer mixture of the formula

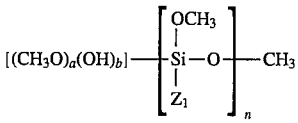

wherein $Z_2$ is —[(CH$_2$)$_3$NH(CH$_2$)$_2$NH—CH$_2$—C$_6$H$_5$].HCl, n is an integer from 1 to 20 inclusive, and a+b=1, a≦1, b≦1.

By treatment with Na(OCH$_3$) or other alkali metal alcoholates the hydrochlorides obtained in Examples 1 through 4 can be converted into chlorine-free products of the formula

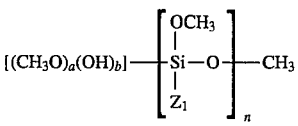

wherein n is an integer from 1 to 20 inclusive, a+b=1, a≦1, b≦1, and

Z is $Z_1$ or $Z_2$.

In reality, Z is a mixture of

—(CH$_2$)$_3$—NH(CH$_2$)$_2$NH$_2$

—(CH$_2$)$_3$—NH(CH$_2$)$_2$NHR"

—(CH$_2$)$_3$—NH(CH$_2$)$_2$NR"$_2$

—(CH$_2$)$_3$—NR"—(CH$_2$)$_2$NH$_2$

—(CH$_2$)$_3$—NR"—(CH$_2$)$_2$NHR"

—(CH$_2$)$_3$—NR"—(CH$_2$)$_2$NR"$_2$ wherein R"=R$^1$ and/or R$^2$=—CH$_2$—C$_6$H$_4$—CH=CH$_2$ when Z=$Z_1$, and R"=R$^2$ and/or R$^1$=—CH$_2$—C$_6$H$_5$ when Z=$Z_2$.

EXAMPLE 5

Preparation of an Aqueous Solution of the End Product of Example 1

92 g of water were introduced into a stirring vessel, and 8 g of the end product of Example 1 were added thereto while stirring. A clear solution resulted which had a silicon content of 0.32% by weight. The onset of turbidity over the course of time could be prevented by acidifying the aqueous solution with acetic acid to a pH of 4.

EXAMPLE 6

Preparation of an Aqueous Solution of the End Product of Example 2

92 g of water were introduced into a stirring vessel, and 8 g of the end product of Example 2 were added while stirring. A clear solution resulted which had a silicon content of 0.30% by weight. The onset of turbidity of the aqueous solution over the course of time could be prevented by acidifying it with acetic acid to a pH of 4.

EXAMPLE 7

Preparation of an Aqueous Solution of the End Product of Example 3

92 g of water were introduced into a stirring vessel, and 8 g of the end product of Example 3 were added thereto while stirring. A clear solution resulted which had a silicon content of 0.32% by weight. The onset of turbidity over the course of time could be prevented by acidifying the solution with acetic acid to a pH of 4.

EXAMPLE 8

Preparation of an Aqueous Solution of the End Product of Example 4

32 g of water were introduced into a stirring vessel, and 8 g of the end product of Example 4 were added thereto while stirring. A clear solution resulted which had a silicon content of 0.30% by weight. The onset of turbidity over the course of time could be prevented by acidifying the solution with acetic acid to a pH of 4.

EXAMPLE 9 (COMPARISON EXAMPLE)

Water solubility test for starting compound of Example 1 [$CH_2$=CH—$C_6H_4$—$CH_2$—NH—($CH_2$)$_2$NH($CH_2$)$_3$Si($OCH_3$)$_3$]HCl:

92 g of water were introduced into a stirring vessel, and 8 g of a 50% by weight solution of compound VI in methanol (Si content: 3.74% by weight) were added while stirring. A precipitate was formed immediately. A homogeneous solution could not be obtained. The theoretical silicon content of the total solution was 0.30% by weight.

EXAMPLE 10 (COMPARISON EXAMPLE)

Water solubility test for

[$C_6H_5$—$CH_2$—NH—($CH_2$)$_2$NH($CH_2$)$_3$Si—($OCH_3$)$_3$]HCl  (VII)

92 g of water were introduced into a stirring vessel, and 8 g of a 50% by weight solution of compound VII in methanol (silicon content: 4.01% by weight) were added while stirring. A non-homogeneous, turbid solution was formed. The theoretical silicon content of the total solution was 0.32% by weight.

EXAMPLE 11

Use of Organosilane Polycondensation Products of the Invention as Glass Fiber Size In accordance with the procedure set forth in DIN (German Industrial Standards) 53390, a bundle of water-sized glass fibers (Vetrotex EC 10, 120 tex) was saturated thoroughly in a silane size prepared by stirring the organosilane or organosilane polycondensation product listed in Table 1 below into water which had been adjusted to a pH of 3.5 to 4.5 with acetic acid, and was then dried for 1 hour at 80° C. The glass fiber bundle was drawn into a calibrated circular glass tube which had an internal diameter of 0.4 cm and a length of 75 cm and was filled with resin, and was then cured with the resin. The glass fiber content was 60% by weight. The glass fiber composite cylindrical rods formed thereby were removed from the glass tube and post-cured. The completely cured rods were each cut to a length of 5 cm, half of which were left untreated and the other half were treated with boiling water for 72 hours. Thereafter, the flexural strength of the treated and untreated rods was determined. The following Table shows the results which were obtained.

TABLE 1

| | UP resin[a] Flexural strength [$N/mm^2$] | | EP resin[b] | |
|---|---|---|---|---|
| Organosilane | untreated | treated | untreated | treated |
| No silane | 7000 | 2100 | 8200 | 2300 |
| Reaction product of DYNASYLAN DAMO[c] with benzyl chloride | | | 8300 | 6200 |
| Partial condensation product of the reaction product of DYNASYLAN DAMO with benzyl chloride | | | 8700 | 6500 |
| Reaction product of DYNASYLAN DAMO with vinylbenzyl chloride | 9100 | 5100 | 8500 | 6300 |
| Partial condensation product of the reaction product of DYNASYLAN DAMO with vinylbenzyl chloride | 11200 | 5000 | 8900 | 6250 |
| DYNASYLAN DAMO | | | 8500 | 6100 |

[a] Palatal P6 (BASF), curing with dibenzoyl peroxide
[b] Araldite BY 5022/HY 5022/1 (Ciba-Geigy)
[c] DYNASYLAN DAMO: N-aminoethyl-3-aminopropyltrimethoxysilane
The tests confirm that the partial condensation products are equivalent or even superior to the parent compounds.

EXAMPLE 12

Use of Organosilane Polycondensation Products of this Invention as Filler Coating 500 parts by weight of cristobalite flour (SF 3000, Quarzwerke GmbH) were coated in a high-speed mixer by metering in 2.5 parts by weight (0.5%) of the organosilane or organosilane partial condensation product shown in Table 2 below, and the coated flour was then heated at 80° C. for ½ hour. After stirring 156 parts by weight of coated or uncoated cristobalite flour homogeneously into 144 parts by weight of UP resin (Vestopal 155, HÜLS AG), degree of filling 52%, and controlling the temperature at 20° C., the viscosity was measured by means of a Brookfield viscometer. 2.9 g of dibenzoyl peroxide and 1.4 g of cobalt accelerator (1%) were then added, and the mixture was homogenized, purged of gas and poured into a metal mold from which, after curing for 2 hours at room temperature and post-curing for 2 hours at 110° C., 20×20×0.4 cm plates were obtained. 0.6×0.4×5 cm test pieces were cut from these plates. Half of them were left untreated and the other half were treated with boiling water for 16 hours, and the flexural strength of each test piece was then determined. The results of these tests are shown in Table 2.

TABLE 2

| Organosilane | Viscosity [mPa × s] | Flexural strength [N/mm²] | |
|---|---|---|---|
| | | untreated | treated |
| No silane | 13800 | 65.3 | 47.5 |
| Reaction product of DYNASYLAN DAMO with vinylbenzyl chloride | 3600 | 100 | 70 |
| Partial condensation product of the reaction product of DYNASYLAN DAMO with vinylbenzyl chloride | 3600 | 97 | 68 |

The tests confirm that the partial condensation products are equivalent to the parent compounds.

Other products of the invention include [HCl.CH$_2$=CH—C$_6$H$_4$—CH$_2$—NH(CH$_2$)$_2$NH(CH$_2$)$_3$—Si(CH$_3$)(OCH$_3$)$_b$(OH)$_a$]$_r$ from CH$_2$=CH—C$_6$H$_4$—CH$_2$Cl and NH$_2$(CH$_2$)$_2$NH(CH$_2$)$_3$—Si(CH$_3$)(OCH$_3$)$_2$. Still other products, in an oligomer-isomer form include

[CH$_3$COOH.C$_6$H$_5$CH$_2$NH(CH$_2$)$_2$NH(CH$_2$)$_3$SiO$_{[1.5-(a+b)/2]}$(OH)$_a$(OCH$_3$)$_b$]$_r$,

[HCl.C$_6$H$_5$CH$_2$NH(CH$_2$)$_2$NH(CH$_2$)$_3$SiO$_{[1.5-(a+b)/2]}$(OH)$_a$(OCH$_3$)$_b$]$_r$,

[CH$_3$COOH.CH$_2$=CH—C$_6$H$_4$CH$_2$NH(CH$_2$)$_2$NH(CH$_2$)$_3$SiO$_{[1.5-(a+b)/2]}$(OH)$_a$(OCH$_3$)$_b$]$_r$,

[HCl.CH$_2$=CH—C$_6$H$_4$CH$_2$NH(CH$_2$)$_2$NH(CH$_2$)$_3$SiO$_{[1.5-(a+b)/2]}$(OH)$_a$(OCH$_3$)$_b$]$_r$.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. An organosilane polycondensation product of the formula $$[Z-SiO_{[1.5-(a+b+z)/2]}(OH)_a(OR)_bR'_z]_r \quad (I)$$

wherein

R and R' are each independently alkyl of 1 to 8 carbon atoms;

Z is $$-(CH_2)_nNH_cR_d^1(CH_2)_mNH_eR_f^2.HX_{(f+d)}; \quad (II)$$

X is an anion of an organic or inorganic acid;

R$^1$ is —(CH$_2$)$_p$Ar$^1$ or vinylbenzyl;

R$^2$ is —(CH$_2$)$_q$Ar$^2$ or vinylbenzyl;

Ar$^1$ and Ar$^2$ are each independently aryl, aralkyl or aralkenyl;

0<a<3, 0<b<3, (a+b+z)<3, z≦1, r>1;

n, m, p and q are each independently integers of 1 to 8, inclusive; and c≦1, d≦1, e≦2, f≦2, c+d=1, e+f=2, 1≦(f+d)≦3.

2. The organosilane polycondensation product of claim 1 wherein X is Cl⁻ or CH$_3$COO⁻.

3. The organosilane polycondensation product of claim 1 selected from the group consisting of

[CH$_3$COOH.C$_6$H$_5$CH$_2$NH(CH$_2$)$_2$NH(CH$_2$)$_3$SiO$_{[1.5-(a+b)/2]}$(OH)$_a$(OCH$_3$)$_b$]$_r$,

[HCl.C$_6$H$_5$CH$_2$NH(CH$_2$)$_2$NH(CH$_2$)$_3$SiO$_{[1.5-(a+b)/2]}$(OH)$_a$(OCH$_3$)$_b$]$_r$,

[CH$_3$COOH.CH$_2$=CH—C$_6$H$_4$CH$_2$NH(CH$_2$)$_2$NH(CH$_2$)$_3$SiO$_{[1.5-(a+b)/2]}$(OH)$_a$(OCH$_3$)$_b$]$_r$, and

[HCl.CH$_2$=CH—C$_6$H$_4$CH$_2$NH(CH$_2$)$_2$NH(CH$_2$)$_3$SiO$_{[1.5-(a+b)/2]}$(OH)$_a$(OCH$_3$)$_b$]$_r$.

4. The method of claim 1, which additionally comprises performing the hydrolysis in the presence of an inert solvent to adjust the viscosity of the reaction product.

5. The method of claim 4, wherein said solvent is a monohydric or polyhydric, branched-chain, straight-chain or cyclic alcohol of 1 to 18 carbon atoms.

6. The method of claim 1, wherein R$^1$ and R$^2$ are each independently benzyl or vinylbenzyl.

7. A method of preparing an organosilane polycondensation product of the formula $$(Z-SiO_{[1.5-(a+b+z)/2]}(OH)_a(OR)_bR'_z)_r \quad (I)$$

wherein

R and R' are each independently alkyl of 1 to 8 carbon atoms;

Z is $$-(CH_2)_nNH_cR_d^1(CH_2)_mNH_eR_f^2.HX_{(f+d)} \quad (II);$$

X is an anion of an organic or inorganic acid;

R$^1$ is —(CH$_2$)$_p$Ar$^1$ or vinylbenzyl;

R$^2$ is —(CH$_2$)$_q$Ar$^2$ or vinylbenzyl;

Ar$^1$ and Ar$^2$ are each independently aryl, aralkyl or aralkenyl;

0<a<3, 0<b<3, (a+b+z)<3, z≦1, r>1;

n, m, p and q are each independently integers of 1 to 8, inclusive, and c≦1, d≦1, e≦2, f≦2, c+d=1, e+f=2;

the method comprising: partially hydrolyzing a compound of the formula $$H_2N(CH_2)_mNH(CH_2)_nSi(OR)_{3-z}R'_z \quad (IV)$$

with 0.25 to 4 moles of water per mole of compound of formula IV based on the silane content thereof to form a condensation product; and then reacting the condensation product with a compound of the formula $$X-R^1 \quad (V)$$

wherein X and R$^1$ have the above-defined meanings.

8. The method of claim 7, which additionally comprises performing the hydrolysis and the subsequent reaction of the condensation product in the presence of an inert solvent to adjust the viscosity of the reaction product.

9. The method of claim 8, wherein said solvent is a monohydric or polyhydric, branched-chain, straight-chain or cyclic alcohol of 1 to 18 carbon atoms.

10. The method of claim 7, wherein compound V is vinylbenzyl chloride or benzyl chloride.

11. A water-soluble, functionalized, polycondensed organosilane obtained by partial hydrolysis of $NH_2(CH_2)_2NH(CH_2)_3Si(OCH_3)_3$ and reaction of the hydrolysis product with a compound selected from the group consisting of $CH_2=CH-C_6H_4-CH_2Cl$ and $C_6H_5-CH_2Cl$.

12. The water-soluble, functionalized organosilane of claim 11, wherein the hydrolysis product has a polymerization degree n of 1 to 20.

13. A method for the preparation of a water-soluble, functionalized polycondensed organosilane of claim 11 comprising partially hydrolyzing $NH_2(CH_2)_2NH(CH_2)_3Si(OCH_3)_3$ to form a hydrolysis product; and reacting the hydrolysis product with $CH_2=CH-C_6H_4-CH_2Cl$ or $C_6H_5-CH_2Cl$.

14. The method of claim 13, wherein the aminoethylaminopropyltrimethoxysilane is dissolved in methanol.

15. The method of claim 13, wherein the aminoethylaminopropyltrimethoxysilane and the water are used in a molar ratio of 1:0.25 to 4 based on the silicon content of the silane.

16. The method of claim 13, wherein the reactions are performed under nitrogen shielding.

17. The method of claim 13, wherein the reactions are performed in a temperature range of from room temperature to 65° C.

18. The method of claim 13, wherein the reactions take place over a period of up to 4 hours.

19. The method of claim 13, wherein alcohol is added to the reaction mixture and/or product mixture.

20. The method of claim 19, wherein the alcohol is selected from methanol, ethanol or mixtures thereof.

21. A water-soluble, functionalized, polycondensed organosilane, obtained by partial hydrolysis of $[C_6H_5-CH_2-NH(CH_2)_2NH(CH_2)_3Si(OCH_3)_3]$·HCl (N-benzyl-aminoethylaminopropyltrimethoxysilane hydrochloride) or $[CH_2=CH-C_6H_5-CH_2-NH(CH_2)_2NH(CH_2)_3Si(OCH_3)_3]$·HCl (N-vinylbenzylaminoethylaminopropyltrimethoxysilane hydrochloride).

22. The water-soluble, functionalized, polycondensed organosilane of claim 21, wherein the hydrolysis product has a degree of polymerization n of 1 to 20.

23. A method for the preparation of water-soluble, functionalized polycondensed organosilane according to claim 21, comprising partially hydrolyzing $[C_6H_5-CH_2-NH(CH_2)_2NH(CH_2)_3Si(OCH_3)_3]$·HCl (N-benzyl-aminoethylaminopropyltrimethoxysilane hydrochloride) or $[CH_2=CH-C_6H_5-CH_2-NH(CH_2)_2NH(CH_2)_3Si(OCH_3)_3]$·HCl (N-vinylbenzylaminoethylaminopropyltrimethoxysilane hydrochloride).

24. The method of claim 23, wherein the silane hydrochloride is dissolved in methanol.

25. The method of claim 23, wherein the silane hydrochloride and the water are used in a molar ratio of 1:0.25 to 4 based on the silicon content of the silane.

26. The method of claim 23, wherein the reaction is conducted under a nitrogen shield.

27. The method of claim 23, wherein the reaction is performed in a temperature range of from room temperature to 65° C.

28. The method of claim 23, wherein the reaction takes place over a time period of up to 4 hours.

29. The method of claim 23, wherein an alcohol is added to the reaction mixture and/or product mixture.

30. The method of claim 29, wherein the alcohol is at least one of methanol and ethanol.

31. A method of preparing an organosilane polycondensation product of the formula

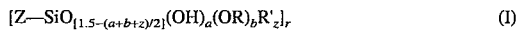

$$[Z-SiO_{[1.5-(a+b+z)/2]}(OH)_a(OR)_bR'_z]_r \qquad (I)$$

wherein

R and R' are each independently alkyl of 1 to 8 carbon atoms;

Z is

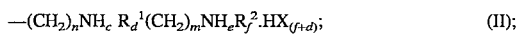

$$-(CH_2)_nNH_c\ R_d^1(CH_2)_mNH_eR_f^2 \cdot HX_{(f+d)}; \qquad (II);$$

X is an anion of an organic or inorganic acid;

$R^1$ is $-(CH_2)_pAr^1$ or vinylbenzyl;

$R^2$ is $-(CH_2)_qAr^2$ or vinylbenzyl;

$Ar^1$ and $Ar^2$ are each independently aryl, aralkyl or aralkenyl;

$0<a<3$, $0<b<3$, $(a+b+z)<3$, $z\leq 1$, $r>1$;

n, m, p and q are each independently integers of 1 to 8, inclusive; and $c\leq 1$, $d\leq 1$, $e\leq 2$, $f\leq 2$, $c+d=1$, $e+f=2$, $1\leq(f+d)\leq 3$;

the method comprising: partially hydrolyzing a compound of the formula

$$Z-Si(OR)_{3-z}R'_z \qquad (III)$$

wherein the compound of formula III and the water are used in a molar ratio of 1:0.25 to 4 based on the silane content of the compound of formula III.

* * * * *